(12) United States Patent
Dudar et al.

(10) Patent No.: US 9,714,030 B2
(45) Date of Patent: Jul. 25, 2017

(54) METHOD FOR DETECTING LEAKS IN AN INTAKE MANIFOLD

(71) Applicant: Ford Global Technologies, LLC, Dearborn, MI (US)

(72) Inventors: Aed M. Dudar, Canton, MI (US); Chingpo Liu, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 14/709,048

(22) Filed: May 11, 2015

(65) Prior Publication Data

US 2016/0332620 A1   Nov. 17, 2016

(51) Int. Cl.

| G01M 15/04 | (2006.01) |
|---|---|
| B60W 20/50 | (2016.01) |
| F02D 41/00 | (2006.01) |
| F02D 29/02 | (2006.01) |
| F02M 35/10 | (2006.01) |
| F02D 41/04 | (2006.01) |
| F02D 41/22 | (2006.01) |
| F02M 25/08 | (2006.01) |
| F02D 13/02 | (2006.01) |
| F02D 41/02 | (2006.01) |
| F02N 11/08 | (2006.01) |

(52) U.S. Cl.
CPC ......... *B60W 20/50* (2013.01); *F02D 13/0203* (2013.01); *F02D 29/02* (2013.01); *F02D 41/0002* (2013.01); *F02D 41/0037* (2013.01); *F02D 41/0055* (2013.01); *F02D 41/042* (2013.01); *F02D 41/22* (2013.01); *F02M 25/089* (2013.01); *F02M 35/10222* (2013.01); *B60W 2510/06* (2013.01); *F02D 41/0225* (2013.01); *F02D 2041/001* (2013.01); *F02D 2041/0095* (2013.01); *F02D 2041/225* (2013.01); *F02D 2200/0406* (2013.01); *F02N 11/0814* (2013.01); *Y10S 903/905* (2013.01)

(58) Field of Classification Search
USPC .............. 73/114.31, 114.32, 114.33, 114.36, 73/114.37
See application file for complete search history.

(56) References Cited

U.S. PATENT DOCUMENTS

| 5,107,698 | A | * | 4/1992 | Gilliam | ................... | G01M 3/20 73/40.7 |
|---|---|---|---|---|---|---|
| 6,016,690 | A | * | 1/2000 | Cook | .................... | G01M 3/025 73/40.5 R |
| 6,886,399 | B2 | | 5/2005 | Schnaibel et al. | | |

(Continued)

FOREIGN PATENT DOCUMENTS

WO   9312332   6/1993

*Primary Examiner* — Eric S McCall
(74) *Attorney, Agent, or Firm* — Julia Voutyras; McCoy Russell LLP

(57) ABSTRACT

Methods and systems are provided for detecting leaks in an intake manifold of an engine. In one example, a method may include closing all intake valves of all cylinders of the engine during an engine shut down responsive to vacuum in the intake manifold reaching a pre-determined vacuum level. The method may further include indicating a leak in the intake manifold responsive to a change in a level of vacuum in the intake manifold after closing all the intake valves of all cylinders.

20 Claims, 8 Drawing Sheets

(56) References Cited

U.S. PATENT DOCUMENTS

| | | | |
|---|---|---|---|
| 2003/0106366 A1* | 6/2003 | Shidara | F02B 61/045 73/114.38 |
| 2003/0230287 A1* | 12/2003 | Ozeki | F02D 41/222 123/479 |
| 2004/0210379 A1* | 10/2004 | Kirschke | F02D 41/22 701/114 |
| 2005/0044930 A1* | 3/2005 | Finlay | G01M 3/025 73/40.7 |
| 2007/0256478 A1* | 11/2007 | Guadagnola | G01M 3/3254 73/40 |
| 2008/0255749 A1* | 10/2008 | Murakami | F02D 17/02 701/103 |
| 2009/0187301 A1* | 7/2009 | Wang | F02D 41/18 701/31.4 |
| 2011/0100106 A1* | 5/2011 | Spargo | G01M 15/02 73/114.37 |
| 2011/0282598 A1* | 11/2011 | Ungermann | F02D 41/0002 702/51 |
| 2013/0032127 A1* | 2/2013 | Jentz | F02N 11/003 123/520 |

* cited by examiner

METHOD FOR DETECTING LEAKS IN AN INTAKE MANIFOLD

FIELD

The present description relates generally to detecting leaks in an intake manifold of an internal combustion engine.

BACKGROUND/SUMMARY

Leaner than desired air-fuel ratios in an engine may be caused by unmetered air entering the engine via leaks in an engine intake manifold. For example, a leaky canister purge valve may allow additional air into the engine intake manifold. Alternatively, a degraded mass air flow sensor may also result in leaner than desired engine conditions. Engine conditions with leaner than desired air-fuel ratios can degrade engine performance and increase emissions. Accordingly, various approaches may be employed to diagnose reasons for lean engine conditions.

Example diagnostic methods may include detecting degradation in the mass air flow sensor, exhaust gas sensor, and/or leaks in the canister purge valve. Another example diagnostic approach is shown by Schnaibel et al. in U.S. Pat. No. 6,886,399 wherein intake manifold pressure is monitored to determine a leak in the intake manifold. Specifically, intake manifold pressure is monitored after engine shut down and after an intake throttle is closed. Further, air flow into the intake manifold from other sources such as an exhaust gas recirculation (EGR) valve and a canister purge valve is also terminated while monitoring changes in the intake manifold pressure after engine shut down. If intake manifold pressure increases at a rate higher than a pre-determined threshold rate, a leak may be indicated.

The inventors herein have recognized potential issues with the example approach in U.S. Pat. No. 6,886,399. As one example, the rate of increase in intake manifold pressure after engine shut down may be different based on a position of each intake valve and/or exhaust valve of each cylinder. For example, if the engine shuts down with intake and exhaust valves of multiple cylinders in an open position, the cylinders and the intake manifold may be exposed to the atmosphere via the exhaust passage. Herein, the rate of change in intake manifold pressure may be substantially different relative to the rate of change in intake manifold pressure when fewer cylinders are open to the atmosphere. As such, these differences in rate of change of intake manifold pressure may cause errors in the diagnosis of leaks in the intake manifold. To reduce such errors, a controller of the engine may be programmed with look-up tables indicating an expected rate of change of intake manifold based on various positions of each intake valve and exhaust valve of each cylinder. Herein, the leakage diagnosis may be more complicated, more time consuming as well as having reduced efficiency.

In one example, the issues described above may be at least partly addressed by a method for an engine, comprising adjusting all intake valves closed in each cylinder of the engine responsive to vacuum in an intake manifold reaching a pre-determined vacuum during engine shut down, and indicating a leak in the intake manifold based on a change in a level of vacuum in the intake manifold. In this way, leaks in the intake manifold may be detected in a more reliable manner.

As an example, a leak check for an intake manifold in an engine may be initiated during an anticipated engine shut down. As the engine spins down to rest, air flow into the intake manifold may be discontinued by closing an intake throttle as well as other supplementary air flows including exhaust gas recirculation, canister purge, etc. Piston motion in the cylinders of the engine may generate vacuum in the intake manifold. The vacuum in the intake manifold may be monitored and once a pre-determined vacuum level is reached, all intake valves of all cylinders of the engine may be adjusted closed. For example, electro-mechanical actuators may be utilized to close all the intake valves. In another example, all exhaust valves of all cylinders of the engine may be adjusted closed. A change in the vacuum level in the intake manifold after closing all intake valves may indicate a leak. Specifically, a decrease in the vacuum level in the intake manifold may indicate a leaky intake manifold.

In this way, leaks in the intake manifold may be determined in a simpler manner with higher accuracy. By closing all intake valves (or all exhaust valves) of all cylinders of the engine, the intake manifold may not be exposed to the atmosphere and a desired level of vacuum may be trapped in the intake manifold each time the test is initiated. Further, by trapping the same desired level of vacuum in the intake manifold at each leak test, more reliable results may be obtained. Further still, the leak test may be performed without relying on look-up tables for different rates of change in intake manifold pressure. Overall, the leak test may be less complex and may be performed more efficiently.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
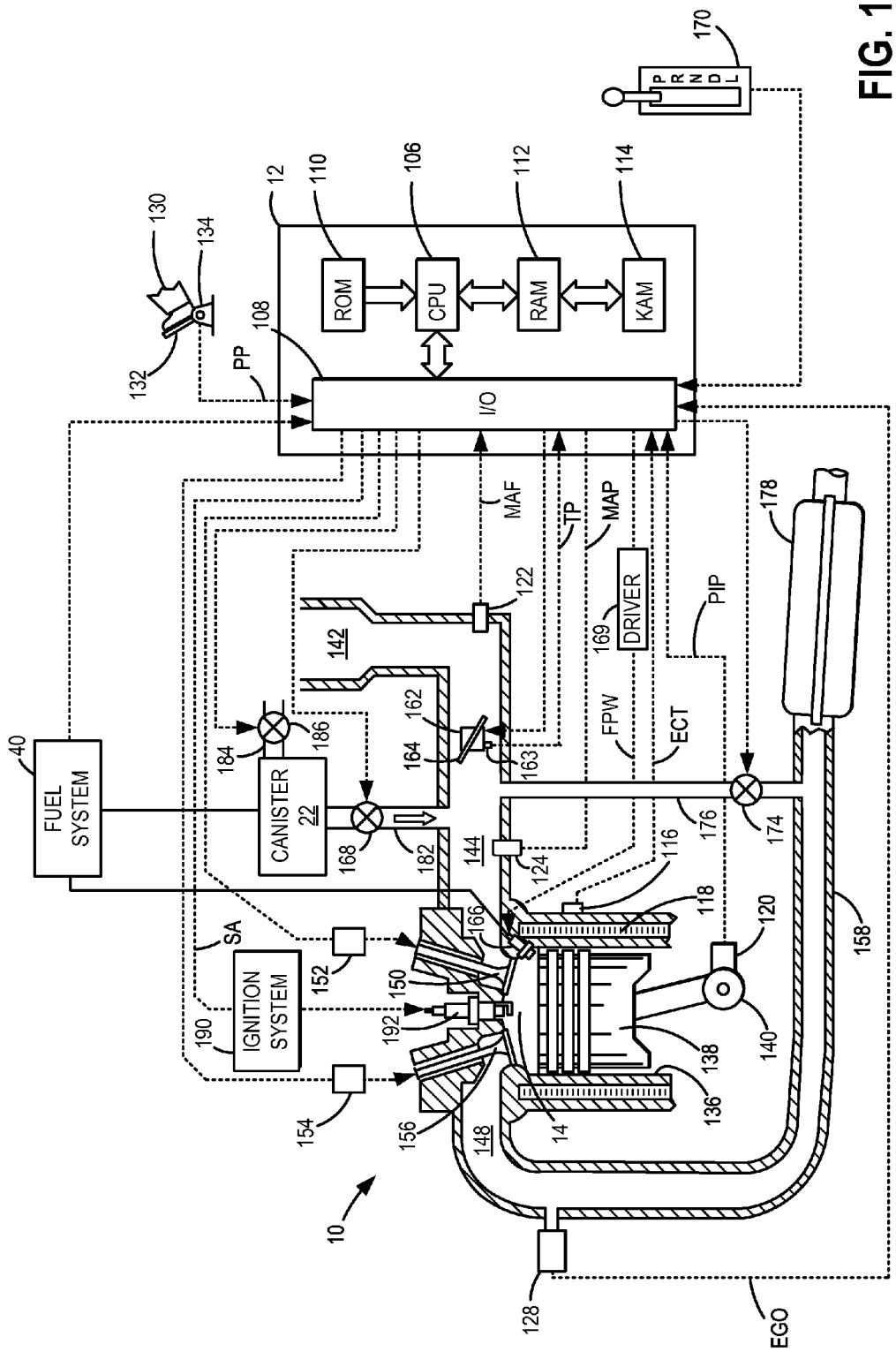
FIG. 1 depicts a schematic engine.
Figure 6:
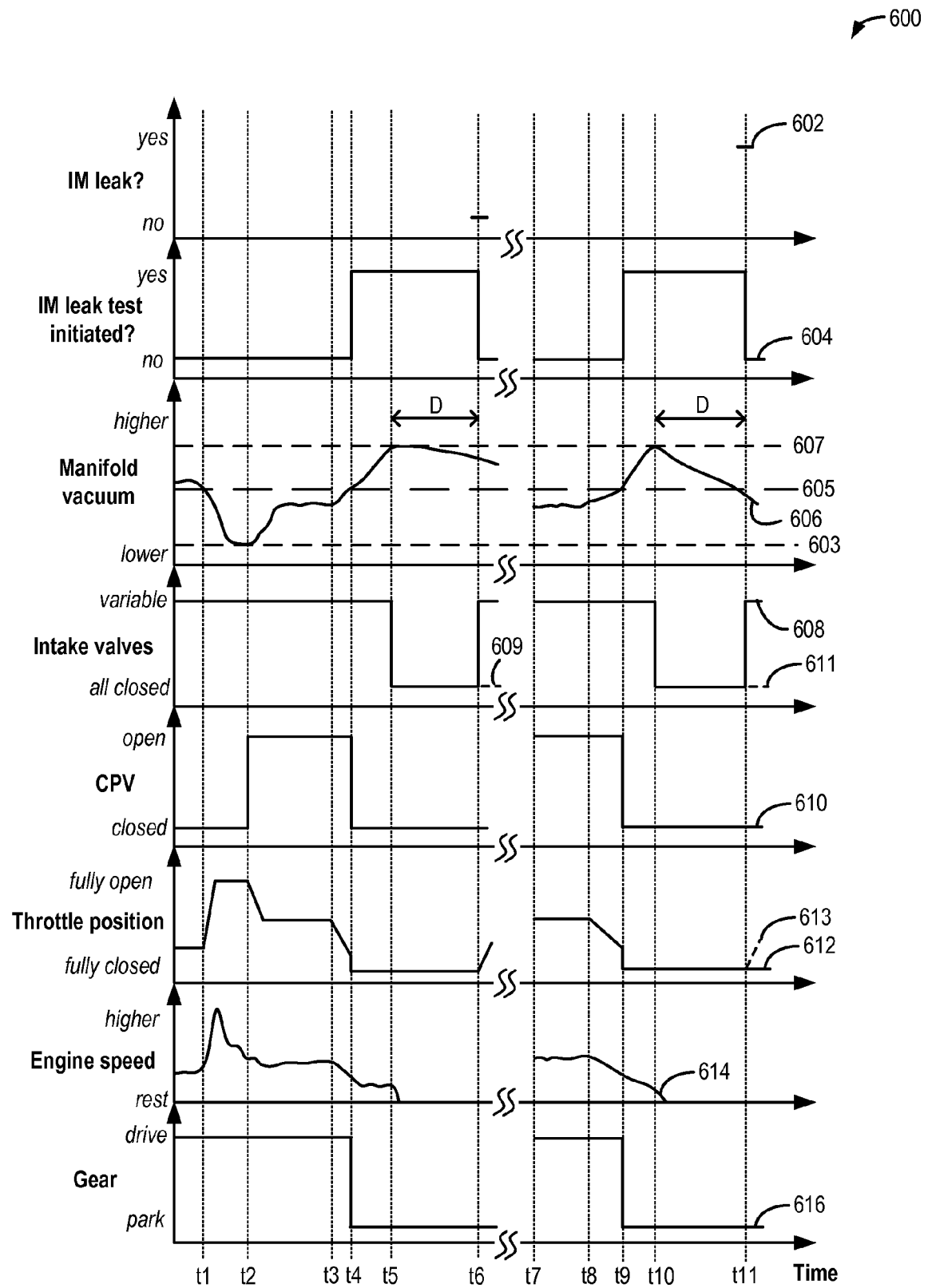
FIG. 6 illustrates an example leak test in the engine of a non-hybrid vehicle.
Figure 7:
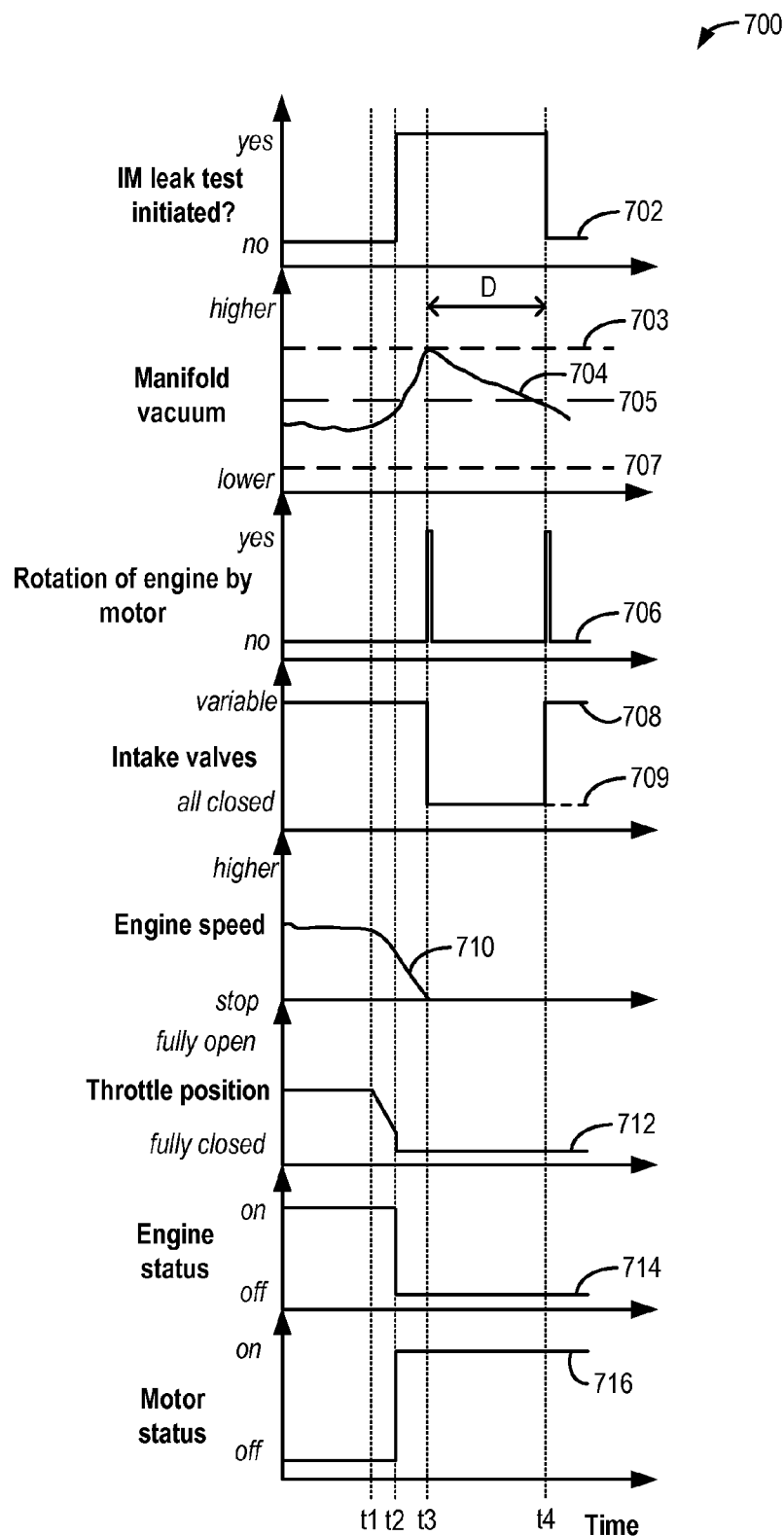
FIG. 7 depicts an example leak test in the engine of a hybrid vehicle.

The following description relates to systems and methods for determining leaks in an intake manifold of an engine system, such as the example engine system of FIG. 1. The engine system may be part of a hybrid vehicle propulsion system, such as the hybrid vehicle system of FIG. 2. A leak test may be initiated in the engine responsive to lean engine conditions being detected in the engine (FIG. 3). As such, the leak test may include generating a vacuum in the intake manifold as the engine shuts down to rest (FIGS. 4A, 4B) by closing an intake throttle as well as terminating air flow from other sources. In response to vacuum in the intake manifold attaining a pre-determined level, all intake valves of all cylinders of the engine may be fully closed. In a camless engine, the intake valves may be adjusted closed via an electro-mechanical actuator. In a hybrid vehicle, the intake valves may be adjusted closed by rotating the engine (FIG. 5) using a generator in the hybrid vehicle system. Alternative approaches to sealing the engine from the atmosphere may be used such as additional valves etc. As such, vacuum in the intake manifold may be held at substantially the pre-determined level unless a leak is present in the intake manifold. Herein, the leak is indicated when vacuum in the intake manifold decreases below a threshold within a threshold period (FIG. 6). An example leak test for a hybrid vehicle system is depicted in FIG. 7.

Regarding terminology used herein, a vacuum may also be termed "negative pressure". Both vacuum and negative pressure refer to a pressure lower than atmospheric pressure.

FIG. 1 depicts an example of a combustion chamber 14 or cylinder 14 of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder 14 (herein also termed combustion chamber 14) of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system (not shown). Further, a starter motor (not shown) may be coupled to crankshaft 140 via a flywheel (not shown) to enable a starting operation of engine 10.

Cylinder 14 can receive intake air via intake passage 142 and intake manifold 144. Intake passage 142 and intake manifold 144 can communicate with other cylinders of engine 10 in addition to cylinder 14. In some examples, one or more of the intake passages may include a boosting device such as a turbocharger or a supercharger (not shown).

Exhaust manifold 148 can receive exhaust gases from other cylinders of engine 10 in addition to cylinder 14. Exhaust gas sensor 128 is shown coupled to exhaust passage 158 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake manifold 144 may be in fluidic communication with cylinder 14 via intake valve 150.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). Actuators 152 and 154 may be of the electric valve actuation type. In another example, actuators 152 and 154 may be electro-mechanical actuators. As such, engine 10 may be a camless engine. Herein, the opening and closing of the intake and exhaust valves may be performed in an electro-mechanical manner. Specifically, each intake valve and each exhaust valve of each cylinder may be opened and/or closed independent of rotation of the crankshaft 140. In other words, each intake valve in the camless engine may be a camless intake valve, and each exhaust valve of the camless engine may be a camless exhaust valve. In an alternative example, engine 10 may include valve actuators that are of the cam actuation type, or a combination thereof to enable variable valve timing. For example, a hybrid vehicle system, such as that shown in FIG. 2, may include an engine which includes camshafts to control intake valves and exhaust valves. Alternatively, the hybrid vehicle system of FIG. 2 may include a camless engine.

In one example, cylinder 14 may alternatively include an intake valve controlled via electric valve actuation and an exhaust valve controlled via cam actuation including cam profile switching (CPS), variable valve timing (VVT), and/or variable cam timing (VCT). In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including fuel injector 166. Fuel injector 166 may be configured to deliver fuel received from fuel system 40. Fuel injector 166 is shown coupled directly to cylinder 14 for injecting fuel directly therein in proportion to the pulse width of signal FPW received from controller 12 via electronic driver 169. In this manner, fuel injector 166 provides what is known as direct injection of fuel into cylinder 14. While FIG. 1 shows fuel injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 40 via a high pressure fuel pump, and a fuel rail. Further, the fuel tank may have a pressure transducer providing a signal to controller 12.

In some embodiments, combustion chamber 14 may alternatively or additionally include a fuel injector arranged in intake manifold 144 in a configuration that provides what is known as port injection of fuel into the intake port upstream of combustion chamber 14.

Intake manifold 144 is shown communicating with intake throttle 162 having a throttle plate 164. In this particular example, the position of throttle plate 164 may be varied by controller 12 via a signal provided to an electric motor or actuator (not shown in FIG. 1) included with intake throttle 162, a configuration that is commonly referred to as electronic throttle control (ETC). Intake throttle position may be varied by the electric motor via a shaft. Intake throttle 162 may control airflow from intake passage 142 to intake manifold 144 and combustion chamber 14 (and other engine cylinders). The position of throttle plate 164 may be provided to controller 12 by throttle position signal TP from throttle position sensor 163.

Further, in the disclosed embodiment, an exhaust gas recirculation (EGR) system may route a desired portion of exhaust gas from the exhaust passage 158 to the intake manifold 144 via an EGR passage 176. The amount of EGR provided may be varied by controller 12 via an EGR valve 174. By introducing exhaust gas to the engine 10, the amount of available oxygen for combustion is decreased, thereby reducing combustion flame temperatures and reducing the formation of $NO_x$, for example. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Fuel system canister 22 (also termed canister 22) is fluidically coupled to one or more fuel tanks of fuel system 40. Canister 22 may be filled with an appropriate adsorbent for temporarily trapping fuel vapors (including vaporized hydrocarbons) generated during fuel tank refueling operations, as well as diurnal vapors. In one example, the adsorbent used is activated charcoal. When canister purging conditions are met, such as when the canister is saturated, vapors stored in fuel system canister 22 may be purged to intake manifold 144, via purge line 182 by opening canister purge valve 168. The purged fuel vapors may then be drawn into cylinder 14 for combustion. While a single canister 22 is shown, it will be appreciated that fuel system 40 may include any number of canisters.

Canister 22 further includes a vent line 184 (herein also referred to as a fresh air line) for routing gases out of the canister 22 to the atmosphere when storing, or trapping, fuel vapors from fuel tanks of fuel system 40. Vent line 184 may also allow fresh air to be drawn into fuel system canister 22 when purging stored fuel vapors to intake manifold 144 via purge line 182 and canister purge valve 168. Vent line 184 may include a canister vent valve 186 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapors after having passed through the canister, can be pushed out to the atmosphere. Likewise, during purging operations (for example, during canister regeneration and while the engine is running), the vent valve may be opened to allow a flow of fresh air to strip the fuel vapors stored in the canister. By closing canister vent valve 186, the fuel tank(s) may be isolated from the atmosphere during a fuel system leak test.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14. Further still, engine 10 may be an inline-cylinder engine with its cylinders arranged in an inline manner. Alternatively, the cylinders of engine 10 may be arranged in a V-manner and engine 10 may be one of a V-6, V-8, V-12, etc. engine.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Controller 12 may also receive input from gear selector 170. A vehicle operator 130 may adjust a gear of the transmission by adjusting the position of gear selector 170. In one example, as depicted gear selector 170 may have 5 positions (PRNDL gear selector), however, other embodiments may also be possible. As known in the art, selecting P gear represents a parked position for a vehicle while gear D indicates that the vehicle can be driven.

The controller 12 may receive signals from the various sensors of FIG. 1 and employ the various actuators of FIG. 1 to adjust engine operation based on the received signals and instructions stored on a memory of the controller. Example actuators include EGR valve 174, fuel injector 166, canister purge valve 168, and intake throttle 162. In a camless engine, additional example actuators may include electro-mechanical actuators that control the opening and/or closing of all intake and exhaust valves of all cylinders. The controller 12 may receive input data from the various sensors, process the input data, and trigger the actuators in response to the processed input data based on instruction or code programmed therein corresponding to one or more routines, such as example control routines described herein with regard to FIGS. 3, 4A and 4B, and 5.

Figure 2:
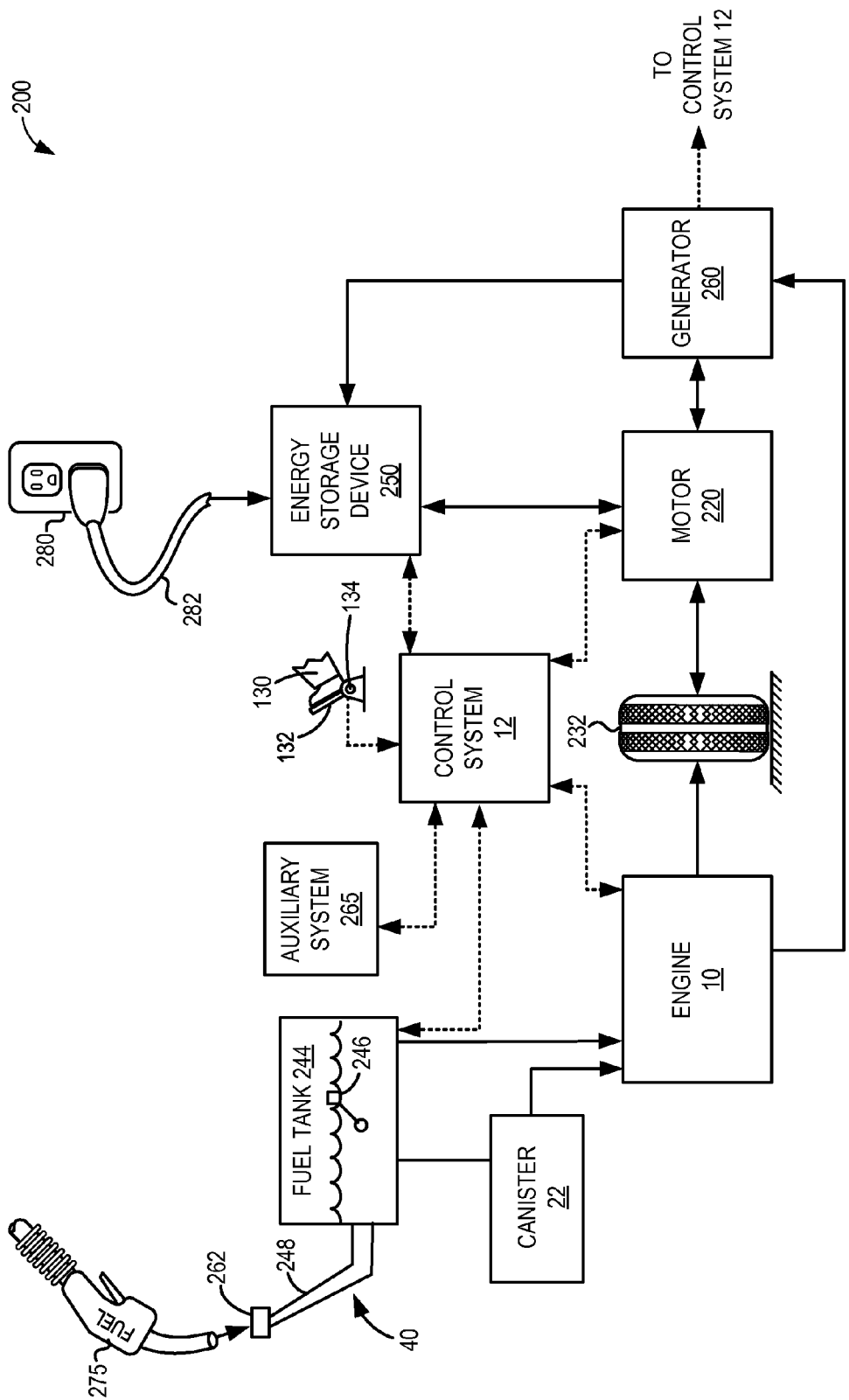
FIG. 2 is a schematic layout of a hybrid vehicle system.
Figure 3:
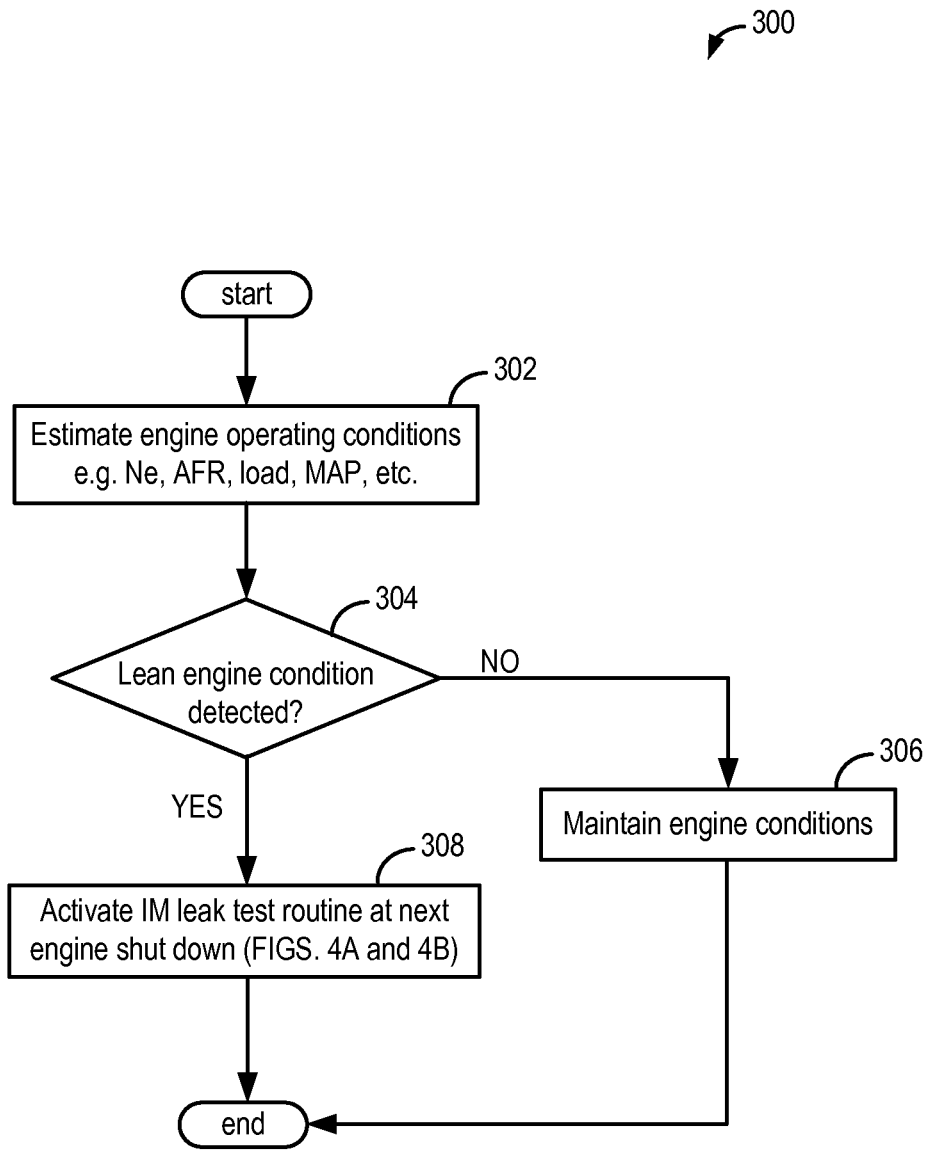
FIG. 3 illustrates a high level flow chart for initiating a leak test of an intake manifold.

FIG. 2 is a schematic depiction of an example vehicle propulsion system 200. Vehicle propulsion system 200 includes a fuel burning engine 10 and a motor 220. As a non-limiting example, engine 10 comprises an internal combustion engine and motor 220 comprises an electric motor.

As such, engine 10 included in vehicle propulsion system 200 may be the same as engine 10 of FIG. 1. Therefore, some components introduced previously in reference to FIG. 1 may be numbered similarly.

Motor 220 may be configured to utilize or consume a different energy source than engine 10. For example, engine 10 may consume a liquid fuel (e.g. gasoline) to produce an engine output while motor 220 may consume electrical energy to produce a motor output. As such, a vehicle with propulsion system 200 may be referred to as a hybrid electric vehicle (HEV). Specifically, the propulsion system 200 depicted herein is a plug-in hybrid electric vehicle (PHEV). PHEVs are also classified as partial zero emissions vehicles (PZEVs) due to their substantially reduced exhaust emissions.

Vehicle propulsion system 200 may be operated in a variety of different modes depending on vehicle operating conditions. Some of these modes may enable engine 10 to be maintained in an off state (or deactivated state) where combustion of fuel at the engine is discontinued. For example, under select operating conditions, motor 220 may propel the vehicle via drive wheel 232 while engine 10 is deactivated.

During other operating conditions, engine 10 may be deactivated while motor 220 is operated to charge energy storage device 250 via regenerative braking. Therein, motor 220 may receive wheel torque from drive wheel 232 and convert the kinetic energy of the vehicle to electrical energy for storage at energy storage device 250. Thus, motor 220 can provide a generator function in some embodiments. However, in other embodiments, a dedicated energy conversion device, herein generator 260, may instead receive wheel torque from drive wheel 232 and convert the kinetic energy of the vehicle to electrical energy for storage at energy storage device 250. Energy storage device 250 may be, for example, a system battery or set of batteries.

During still other operating conditions, engine 10 may be operated by combusting fuel received from fuel system 40. For example, engine 10 may be operated to propel the vehicle via drive wheel 232 while motor 220 is deactivated. During other operating conditions, both engine 10 and motor 220 may each be operated to propel the vehicle via drive wheel 232. A configuration where both the engine and the motor may selectively propel the vehicle may be referred to as a parallel type vehicle propulsion system. Note that in some embodiments, motor 220 may propel the vehicle via a first set of drive wheels and engine 10 may propel the vehicle via a second set of drive wheels.

In other embodiments, vehicle propulsion system 200 may be configured as a series type vehicle propulsion system, whereby the engine does not directly propel the drive wheels. Rather, engine 10 may be operated to power motor 220, which may in turn propel the vehicle via drive wheel 232. For example, during select operating conditions, engine 10 may drive generator 260, which may in turn supply electrical energy to one or more of motor 220 or energy storage device 250. As another example, engine 10 may be operated to drive motor 220 which may in turn provide a generator function to convert the engine output to electrical energy, where the electrical energy may be stored at energy storage device 250 for later use by the motor. The vehicle propulsion system may be configured to transition between two or more of the operating modes described above depending on operating conditions.

Fuel system 40 may include one or more fuel storage tanks 244 for storing fuel on-board the vehicle and for providing fuel to engine 10. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of gasoline and ethanol (e.g., E10, E85, etc.) or a blend of gasoline and methanol (e.g., M10, M85, etc.), whereby these fuels or fuel blends may be delivered to engine 10. Still other suitable fuels or fuel blends may be supplied to engine 10, where they may be combusted at the engine to produce an engine output. The engine output may be utilized to propel the vehicle and/or to recharge energy storage device 250 via motor 220 or generator 260.

Fuel tank 244 may include a fuel level sensor 246 which may comprise a float connected to a variable resistor for sending a signal regarding a fuel level in the tank to controller 12. The level of fuel stored at fuel tank 244 (e.g., as identified by the fuel level sensor) may be communicated to the vehicle operator, for example, via a fuel gauge or indication lamp (not shown) on a dashboard of the vehicle system.

Vehicle propulsion system 200 may include a fuel door 262 located on an outer body of the vehicle for receiving fuel from an external fuel source. Fuel door 262 may be held locked during most vehicle operating conditions so as to contain fuel tank vapors and reduce the release of fuel tank hydrocarbons into the environment. Fuel system 40 may periodically receive fuel from the external fuel source. However, since engine 10 is periodically set to a deactivated state (or engine-off mode) where the consumption of fuel at the engine is significantly reduced or discontinued, long durations may elapse between subsequent fuel tank refilling events. During fuel tank refilling, fuel may be pumped into the fuel tank from fuel dispensing device 275 via a refueling line 248 that forms a passageway from fuel door 262.

Fuel vapors generated in fuel tank 244 due to diurnal events and refueling events may be directed to and stored in canister 22. The canister may include an adsorbent for storing the received fuel vapors. During selected engine operating conditions, fuel vapors may be desorbed from the canister and released into an engine intake for purging.

Vehicle propulsion system 200 may include an auxiliary system 265. The auxiliary system may be, for example, a vehicle navigation system (such as a GPS), or an entertainment system (e.g., radio, DVD player, stereo system, etc.). In one example, where auxiliary system is a vehicle navigation system, location and time data may be transmitted between the controller 12 of the vehicle and a global positioning satellite via wireless communication.

Controller 12 may communicate with one or more of engine 10, motor 220, fuel system 40, energy storage device 250, and generator 260. Specifically, controller 12 may receive feedback from one or more of engine 10, motor 220, fuel system 40, energy storage device 250, and generator 260 and send control signals to one or more of them in response. Controller 12 may also receive an indication of an operator requested output of the vehicle propulsion system from a vehicle operator 130. For example, controller 12 may receive feedback from pedal position sensor 134 which communicates with accelerator pedal 132. Pedal 132 may refer schematically to an accelerator pedal (as shown) or a brake pedal.

Energy storage device 250 may include one or more batteries and/or capacitors. Energy storage device 250 may be configured to store electrical energy that may be supplied to other electrical loads residing on-board the vehicle (other than the motor), including a cabin heating and air conditioning system (e.g., HVAC system), an engine starting system (e.g., starter motor), headlights, cabin audio and video systems, etc.

Energy storage device 250 may periodically receive electrical energy from an external power source 280 not residing in the vehicle. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may be disconnected between power source 280 and energy storage device 250.

In other embodiments, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from the external power source 280. In this way, motor 220 may propel the vehicle by utilizing an energy source other than the fuel utilized by engine 10.

In some embodiments, engine 10 may be configured for selective deactivation. For example, engine 10 may be selectively deactivatable responsive to idle-stop conditions. Therein, responsive to any or all of idle-stop conditions being met, the engine may be selectively deactivated by deactivating cylinder fuel injectors. As such, idle-stop conditions may be considered met if the engine is combusting while a system battery (or energy storage device) is sufficiently charged, if auxiliary engine loads (e.g., air conditioning requests) are low, engine temperatures (intake temperature, catalyst temperature, coolant temperature, etc.) are within selected temperature ranges where further regulation is not required, and a driver requested torque or power demand is sufficiently low. In response to idle-stop conditions being met, the engine may be selectively and automatically deactivated via deactivation of fuel and spark. The engine may then start to spin to rest.

During engine shutdown, the engine may be spun to, and shutdown in, a selected position that improves engine restart e.g. a hot start. For example, one of the cylinders may be positioned such that it is in a compression stroke. Thus, when the controller determines that an engine restart is imminent, fuel is injected into this cylinder and the air and fuel mixture is ignited to provide immediate response. In another example, if a cold start is anticipated, the engine may be rotated to a different position from that used for the hot start. For example, the cylinders may be positioned such that one or more exhaust valves are fully closed to enable a reduced pressure in the intake manifold at a subsequent cold start.

Leaner than desired engine conditions may occur in engine 10 when unmetered air leaks into the intake manifold of engine 10. Sources of such unmetered air can include a degraded EGR valve, a degraded CPV, degradation in related hoses etc. Leaner than desired engine conditions may also occur due to a degraded MAF sensor and/or degradation in an EGO sensor. As such, leaks in the intake manifold may also allow unmetered air into the engine. Leaks in the intake manifold can be diagnosed by generating a desired vacuum level in the intake manifold during an engine shut down and monitoring for a change in the vacuum level after the intake manifold is isolated from the atmosphere by closing either all intake valves of all cylinders or all exhaust valves of all cylinders of the engine. The leak test may be initiated only after leaner than desired engine conditions are detected in the engine, as shown below in reference to FIG. 3.

FIG. 3 includes an example routine 300 for determining initiation of a leak test for an intake manifold of an engine, such as engine 10 of FIGS. 1 and 2. As such, routine 300 will be described with relation to the systems shown in FIGS. 1 and 2, but it should be understood that similar routines may be used with other systems without departing from the scope of this disclosure. Specifically, the leak test is initiated by routine 300 only after leaner than desired engine conditions are detected. In other words, if the air-fuel ratio in the engine is substantially at a desired ratio, the leak test for the intake manifold may not be activated.

Instructions for carrying out routine 300 and the rest of the routines included herein (e.g., routines 400 and 500) may be executed by a controller, such as controller 12 of FIGS. 1 and 2, based on instructions stored on a memory of the controller and in conjunction with signals received from sensors of the engine system, such as the sensors described above with reference to FIG. 1. The controller may employ engine actuators of the engine system to adjust engine operation, according to the routines described below.

At 302, routine 300 estimates existing engine operating conditions. Operating conditions may be measured, estimated, or inferred, and may include conditions such as engine speed, engine load, air-fuel ratio, MAP, as well as vehicle conditions, such as, fuel level, fuel vapor canister load status, etc. Next, at 304, routine 300 determines whether a lean engine condition has been detected. A lean engine condition may be determined based on the output of an EGO sensor. A lean engine diagnostic code may be set if the sensor output indicates that an exhaust oxygen content is above a threshold for a previously determined duration. If a lean engine condition is not detected, routine 300 proceeds to 306 to maintain engine conditions. Routine 300 may then end.

Figure 4A:
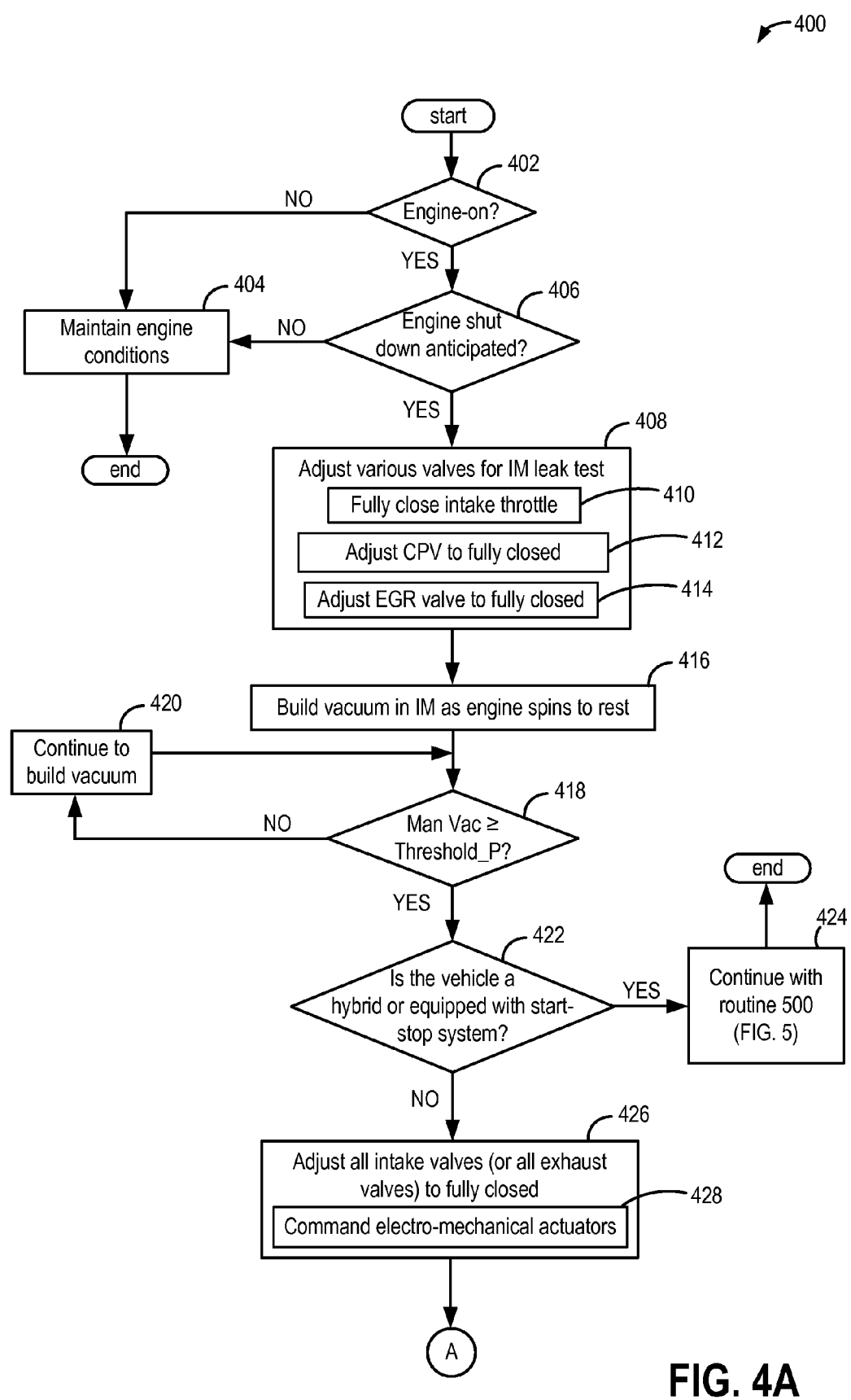
FIGS. 4A and 4B show a high level flow chart for performing the leak test of the intake manifold, according to the present disclosure.
Figure 4B:
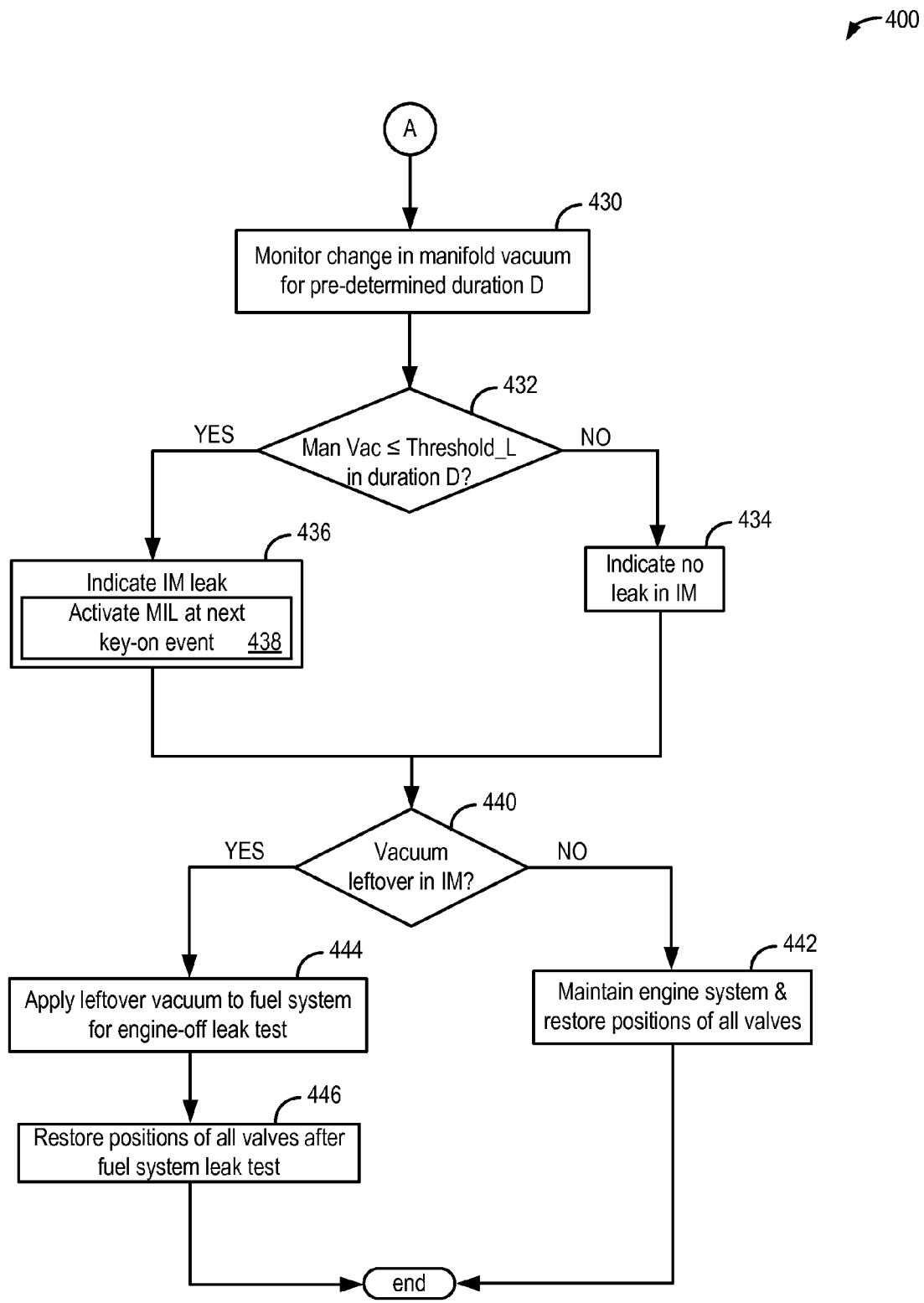

If however, a lean engine condition is confirmed at 304, routine 300 progresses to 308 to determine that a leak test for the intake manifold (IM) is desired at a following engine shut down. Specifically, routine 300 determines that the leak test for the intake manifold be activated when the engine shuts down following the detection of the lean engine condition. The leak test for the intake manifold is described in reference to FIGS. 4A and 4B below. Routine 300 then ends. Turning now to FIGS. 4A and 4B, they depict routine 400 illustrating the leak test for the intake manifold in accordance with the present disclosure. As such, routine 400 may be activated after a lean engine condition is detected, such as by routine 300 of FIG. 3.

Routine 400 will be described with relation to the systems shown in FIGS. 1 and 2, but it should be understood that similar routines may be used with other systems without departing from the scope of this disclosure. Specifically, a pre-determined level of vacuum is generated in the intake manifold of the engine and a change in the level of the vacuum is monitored for detecting leaks. The pre-determined level of vacuum is generated during engine shut down to rest by closing an intake throttle, an EGR valve, a CPV, etc. Once the pre-determined level of vacuum is reached, all intake valves of all cylinders of the engine are adjusted (and maintained) closed to maintain the pre-determined level of vacuum. If a leak is present in the intake manifold, the vacuum level in the intake manifold reduces from the pre-determined level.

At 402, routine 400 determines if the engine is activated and "ON". As such, the engine may be rotating and combusting when "ON". If it is determined that the engine is not activated, routine 400 continues to 404 to maintain the existing engine status and then ends. As such, the engine may not be activated when it is shut down and at rest. For example, in a hybrid vehicle, the engine may be "OFF" and may be deactivated when the hybrid vehicle is being propelled primarily by a motor. In a vehicle where the engine is equipped with an idle-stop system (also termed, a start-stop system), the engine may be deactivated when the vehicle is stopped, e.g. at a traffic light.

If the engine is activated and "ON", routine 400 proceeds to 406 to determine if an engine shut down is anticipated. In one example, an engine shut down to rest may be anticipated when a vehicle operator shifts the gear selector (e.g., gear selector 170 in FIG. 1) to "Park" from a "Drive" position. In another example, engine shut down may be anticipated when the vehicle operator shifts the gear selector from a non-parked position (e.g. reverse gear position, neutral gear position, drive gear position) to a parked position (e.g. park gear position). Herein, the impending engine shut down may be followed by a key-off event wherein the engine spins to rest. In another example, such as in a vehicle equipped with an idle-stop system, an imminent engine shut down may be expected when the engine idles for a duration longer than a threshold duration. In yet another example, the engine in the hybrid vehicle may be shut down when the vehicle is operated on city streets with repetitive stops and starts.

If an engine shut down is not impending, routine 400 continues to 404 to maintain existing engine conditions including valve positions, and then ends. On the other hand, if engine shut down is imminent, routine 400 continues to 408 to adjust various valves for the leak test of the intake manifold. Herein, the various valves are adjusted to discontinue air flow into the intake manifold.

Accordingly, at 410, the intake throttle is adjusted closed. In one example, the intake throttle may be adjusted to a fully closed position from a partly open position. In another example, the intake throttle may be moved to the fully closed position from a mostly open position. As such, the intake throttle is transitioned to the fully closed position at 410 so that intake air does not flow into the intake manifold from the intake passage. Accordingly, intake air flow into the intake manifold via the intake throttle may be discontinued. Further, at 412, the canister purge valve (CPV) may also be adjusted closed, if open. Accordingly, stored fuel vapors from the fuel system canister may not be purged into the intake manifold. Next, at 414, the exhaust gas recirculation (EGR) valve may be adjusted closed. Therefore, exhaust gases from the exhaust passage may no longer be received in the intake manifold. Additional valves that enable air flow into the intake manifold (not specifically listed here) may also be closed. For example, crankcase ventilation flow into the intake manifold may be discontinued. Other sources of air flow into the intake manifold may also be closed. Thus, the intake manifold may now be fluidically coupled to the atmosphere primarily via an open intake valve or an open exhaust valve of a cylinder of the engine.

It will be noted that pistons within the cylinders may continue to reciprocate as the engine spins down to rest. Since the various valves allowing air into the intake manifold are now substantially closed, piston motion in the cylinders builds vacuum in the intake manifold, as at 416 of routine 400. Vacuum in the intake manifold may also be termed manifold vacuum, also termed as Man Vac. At 418, routine 400 confirms if vacuum in the intake manifold is at (or higher than) a pre-determined level, Threshold_P. Pressure in the intake manifold (positive or negative) may be estimated by an MAP sensor. In one example, the pre-determined level of vacuum (or negative pressure) may be 10 inches of mercury. In another example, the pre-determined level of vacuum, Threshold_P, may be 12 inches of mercury. The pre-determined level of vacuum may be selected based on the engine parameters including engine size, number of cylinders, etc. Furthermore, the pre-determined vacuum level, Threshold_P, for a non-hybrid vehicle may be different from a pre-determined vacuum level for a hybrid vehicle. Other levels of pre-determined vacuum may be used without departing from the scope of this disclosure.

If it is determined that the vacuum in the intake manifold is not yet at the pre-determined vacuum, Threshold_P, routine 400 proceeds to 420 to continue to increase vacuum levels in the intake manifold. Vacuum levels in the intake manifold may continue to increase as the engine spins down to rest. Specifically, piston motion in the cylinders of the engine may build vacuum in the intake manifold as long as the intake manifold is in fluidic communication with the cylinders of the engine when the intake valves are open during the cylinder cycle. Thus, the intake valves of all cylinders of the engine may not be closed to enable build-up of vacuum in the intake manifold.

However, if at 418, it is confirmed that the vacuum in the intake manifold is at (or higher than) the pre-determined vacuum level, Threshold_P, routine 400 progresses to 422. At 422, it is determined if the vehicle is a hybrid vehicle or if the vehicle is equipped with a start-stop system. Vehicles equipped with the start-stop system or hybrid vehicles may include a generator and/or a motor that can rotate the engine such that a desired position of intake and/or exhaust valves is attained. If the vehicle is neither a hybrid vehicle nor equipped with the start-stop system, the engine may include intake valves and/or exhaust valves that are actuated independent of crankshaft rotation. For example, the intake valves and/or the exhaust valves may be actuated by electro-mechanical actuators, as described earlier in reference to FIG. 1. The engine may be a camless engine.

Figure 5:
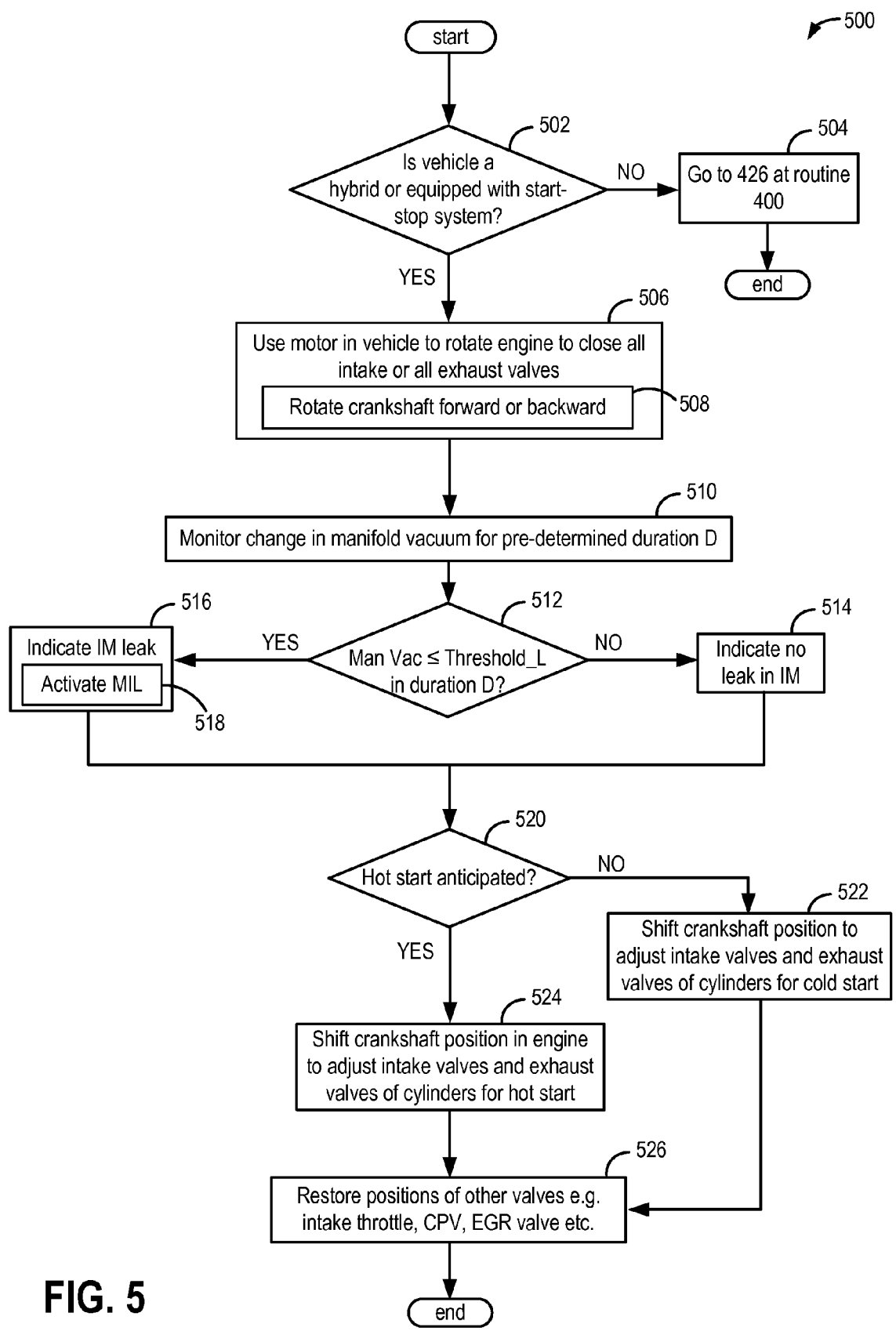
FIG. 5 is a high level flow chart of performing the leak test of the intake manifold in the hybrid vehicle system.

If it is determined that the vehicle is equipped with the start-stop system or that the vehicle is a hybrid vehicle, routine 400 progresses to 424 wherein routine 500 of FIG. 5 is activated. Routine 500 will be described further below in reference to FIG. 5. Routine 400 then ends. However, if the vehicle is not a hybrid vehicle or does not include the start-stop system, routine 400 continues to 426 to adjust all intake valves of all cylinders of the engine to the fully closed position. Alternatively, all exhaust valves of all cylinders of the engine may be adjusted to their fully closed position. In another example, a mix of intake valves and exhaust valves of the engine cylinders may be shifted to their fully closed positions such that each cylinder of the engine is sealed from the atmosphere (e.g., the exhaust passage). At 428, electro-mechanical actuators may be commanded to fully close all the intake valves of each cylinder of the engine. In another example, electro-mechanical actuators may be commanded to fully close all the exhaust valves of each cylinder of the engine. Specifically, each cylinder may be isolated from the atmosphere by closing all intake (or all exhaust) valves of all cylinders. Further still, the intake manifold may also be isolated from the atmosphere by closing all intake (or all exhaust) valves of all cylinders of the engine. Furthermore, vacuum trapped in the intake manifold may be at the pre-determined level, Threshold_P.

It will be noted that the engine may continue to spin down to rest after the intake valves are closed. Thus, the intake valves (and/or exhaust valves) may be adjusted to their fully closed position during engine shut down to rest. In other words, the intake valves (and/or exhaust valves) may be adjusted to their fully closed position before the engine shuts down to rest. However, the controller may be maintained active even after engine shut down (with engine at rest) to monitor for leaks in the intake manifold.

Next, at 430, routine 400 monitors the vacuum level in the intake manifold for a pre-determined duration, D. The pre-determined duration D may, in one example, be 15 seconds. In another example, pre-determined duration D may be 10 seconds. In yet another example, pre-determined duration may be 60 seconds. Longer or shorter durations may be employed without departing from the scope of this disclosure. Next, at 432 routine 400 determines if there is a change in the vacuum level in the intake manifold. As such, the vacuum level may have changed from the pre-determined vacuum level in the pre-determined duration D. Specifically, routine 400 confirms if the vacuum in the intake manifold has decreased below a threshold level, Threshold_L, at 432, within the pre-determined duration D, and after all intake valves (or all exhaust valves) of all cylinders are fully closed. One or more leaks in the intake manifold may draw air into the intake manifold causing a decrease in the level of vacuum from the pre-determined vacuum level within the intake manifold. Threshold_L may be a level of vacuum that is lower than the pre-determined vacuum level, Threshold_P. In terms of pressure, Threshold_L may be higher than Threshold_P.

Accordingly, if vacuum in the intake manifold is lower than the threshold level, Threshold_L, within pre-determined duration D, routine 400 proceeds to 436 to indicate a leak in the intake manifold. Specifically, a malfunction indicator lamp (MIL) may be activated at 438 at the next key-on event. Though not specifically shown, the controller may adjust one or more of fuel injection amount and fuel injection timing responsive to the detection of the intake manifold leak during subsequent engine operation.

On the other hand, if the vacuum level in the intake manifold is higher than the threshold level, Threshold_L, in pre-determined duration D, routine 400 progresses to 434 to determine that intake manifold leaks are not present. Further still, additional diagnostic routines may be triggered to diagnose reasons for lean engine conditions. The leak test of the intake manifold may thus be completed.

Next at 440, routine 400 determines if vacuum is leftover in the intake manifold after completion of the leak test. Completion of the leak test may include indicating a leak in the intake manifold or not indicating a leak in the intake manifold. For example, sufficient vacuum may reside in the intake manifold after the intake manifold leak test, if there are no leaks in the intake manifold. In some examples, a certain amount of vacuum may be trapped in the intake manifold even if the preceding leak test indicates a leak in the intake manifold.

If a sufficient amount of vacuum is leftover in the intake manifold, routine 400 continues to 444 to apply the leftover vacuum to the fuel system for a leak test in the fuel system. Since the intake manifold contains vacuum, a negative pressure engine-off leak test may be performed. Herein, the vacuum may be applied to the fuel system including the canister by opening the CPV. Once a threshold level of vacuum is attained in the fuel system, the CPV may be closed, and the fuel system may be monitored for changes in the level of vacuum. Once the fuel system leak test is completed, routine 400 proceeds to 446 to restore the positions of all valves. For example, the intake throttle may be adjusted to a partly open position from the fully closed position. The intake valves (and/or exhaust valves) may be adjusted to a more open position.

If sufficient vacuum is not remaining in the intake manifold after completion of the intake manifold leak test, routine 400 continues to 442 and the fuel system leak test may not be activated. Further, at 442, all valves may be restored to their desired positions. For example, the intake throttle may be adjusted to a partly open position from the fully closed position. The intake valves (and/or exhaust valves) may be adjusted to a more open position.

Thus, an example method for an engine may comprise adjusting all intake valves closed in each cylinder of the engine responsive to vacuum in an intake manifold reaching a pre-determined vacuum (e.g., Threshold_P of routine 400) during engine shut down, and indicating a leak in the intake manifold based on a change in a level of vacuum in the intake manifold. The change in the level of vacuum in the intake manifold may include a decrease in the level of vacuum from the pre-determined vacuum. Further, the leak may be indicated when the level of vacuum decreases to below a threshold level (e.g., Threshold_L). The vacuum in the intake manifold may be produced by closing an intake throttle and discontinuing flow of air into the intake manifold. Further, the intake throttle may be closed in response to determining an impending engine shut down. Further still, the impending engine shut down may be determined, in one example, when a gear selector is shifted to a parked position. The method may further comprise producing vacuum in the intake manifold by closing each of an exhaust gas recirculation valve and a canister purge valve in response to the impending engine shut down. All intake valves of each cylinder of the engine may be closed via an electro-mechanical actuator. The method may also comprise applying leftover vacuum in the intake manifold to a fuel system for a leak check in the fuel system after indicating the leak in the intake manifold.

Turning now to FIG. 5, it shows routine 500 for continuing the leak test of the intake manifold in a hybrid vehicle or a vehicle equipped with a start-stop system. Specifically, routine 500 may be activated as part of routine 400 if it is determined that the engine of FIG. 1 is included in a hybrid vehicle or a vehicle system equipped with a start-stop system. As such, routine 500 may commence only after 418 in routine 400. To elaborate, routine 500 is activated in the hybrid vehicle or the vehicle equipped with a start-stop system after it is confirmed that the vacuum in the intake manifold is at the pre-determined level, Threshold_P.

At 502, routine 500 confirms that the vehicle is a hybrid vehicle or is alternatively a vehicle equipped with a start-stop (or idle stop) system. Each of the hybrid vehicle and the vehicle equipped with the start-stop system may include a motor supplied by an energy storage device. Further, the motor may be utilized to rotate the engine (specifically, a crankshaft) to a desired position wherein all intake valves and exhaust valves of the cylinders may be closed.

If it is not confirmed that the vehicle is a hybrid vehicle or is alternatively equipped with a start-stop (or idle stop) system, routine 500 proceeds to 504 to return to 426 of routine 400, and then routine 500 ends. As such, routine 400 may then be continued. If, however, it is confirmed that the vehicle is a hybrid vehicle or is equipped with a start-stop (or idle stop) system, routine 500 continues to 506 to use the motor in the vehicle system to rotate the engine. In one example, a hybrid vehicle may include two motors (or a motor and a generator) such that a first motor may propel the vehicle while the engine is shut down while a second motor can rotate the engine to a desired position. It will be noted that a vehicle with the start-stop system may also include a motor to enable engine rotation. Specifically, the motor may be employed to rotate the engine (e.g., the crankshaft) to close all intake valves of all cylinders of the engine. Alternatively, the motor may rotate the crankshaft to close all exhaust valves of all cylinders of the engine. In one example, the motor may adjust the position of the engine only after the engine is at rest. Specifically, the crankshaft may be rotated only after the engine has come to rest.

To elaborate, all the intake valves or all the exhaust valves may be adjusted to their respective fully closed positions (e.g., from an open position) by adjusting the position of the crankshaft. Herein, the crankshaft may be rotated in a forward direction or a backward direction, at 508, to close the intake valves and/or the exhaust valves. In one example, the engine may be rotated in the forward direction. In another example, the engine may be rotated in the backward direction. The choice of rotating the engine (specifically, the crankshaft) in either the forward direction or the backward direction may be dependent on the position of the crankshaft when the engine comes to rest. Further, the selection of direction of rotation of the engine may also be based on which direction offers a quicker adjustment to enable closing all the intake valves (or all the exhaust valves) of all cylinders.

As such, the motor may rotate the engine such that each cylinder of the engine is substantially sealed from the atmosphere. To elaborate, if each cylinder of the engine includes a single intake valve and a single exhaust valve (and no additional intake or exhaust valves), the engine may be rotated by the motor such that at least one of the single intake valve and the single exhaust valve of each cylinder is fully closed. In another example, if each cylinder of the engine includes two intake valves and two exhaust valves, the crankshaft may be rotated such that both intake valves of each cylinder are closed or both exhaust valves of each cylinder are closed. Effectively, each cylinder may be sealed and isolated from the atmosphere. Alternatively, all intake valves and all exhaust valves of each cylinder may be fully closed.

By closing all the intake valves (or all exhaust valves) of each cylinder of the engine, the intake manifold may also be isolated from the atmosphere. Closing all the intake and/or exhaust valves to seal the intake manifold from the atmosphere may enable a more accurate determination of change in the vacuum in the intake manifold. Further, the desired level of vacuum (e.g., pre-determined level of vacuum) may be trapped inside the intake manifold. Next, at 510, changes in the manifold vacuum are monitored, e.g., by monitoring the MAP sensor output. Further still, the manifold vacuum may be monitored for a specific pre-determined duration D. The pre-determined duration D may be based on an average duration of an idle stop, for example. In the depicted example, the pre-determined duration in routine 500 is the same as the pre-determined duration in routine 400. In alternative examples, pre-determined duration for a hybrid vehicle may be different from a pre-determined duration of a non-hybrid vehicle. Similarly, pre-determined duration of vacuum monitoring in a hybrid vehicle may be distinct from a pre-determined duration in a vehicle equipped with a start-stop system.

Next, at 512, routine 500 determines if vacuum levels in the intake manifold have reduced. Specifically, routine 500 determines if the vacuum levels in the intake manifold are lower than a threshold level, Threshold_L, within pre-determined duration D. The threshold level, Threshold_L, may be the same as the threshold level of routine 400. In alternative examples, the threshold level of vacuum may be different for a hybrid vehicle relative to the threshold level for a non-hybrid vehicle.

If it is determined that the manifold vacuum level is lower than the threshold level, Threshold_L within pre-determined duration D, routine 500 progresses to 516 to indicate leaks are present in the intake manifold and at 518, a MIL may be activated to notify the vehicle operator. As such, the controller may also adjust one or more of fuel injection amount and fuel injection timing in response to the indication of manifold leaks.

However, if the vacuum level in the intake manifold remains higher than the threshold level, Threshold_L, within the pre-determined duration D, routine 500 proceeds to 514 to not indicate any leaks in the intake manifold. As such, no indication may be provided to the vehicle operator. Further, in some examples, the controller may activate alternate diagnostic methods to determine the source of leaner than desired engine conditions.

Next, at 520, routine 500 determines if a hot engine start is anticipated. A hot engine start may be expected when the engine is activated following an idle stop condition, e.g., when the vehicle equipped with the start-stop system is stopped at a traffic light. If a hot engine start is expected, routine 500 continues to 524 to shift the position of the crankshaft in the engine to a position that enables a hot engine start. Specifically, the motor may be employed to rotate the crankshaft either forward or backward to a position enabling the hot engine start. For example, the engine may be rotated such that at least one cylinder of the engine is in a compression stroke to enable a rapid restart. In another example, the position of the engine at 506 may be the same position desired for the hot start. Accordingly, the engine position may not be changed after the leak test is completed.

If, however, a hot engine start is not anticipated, routine 500 progresses to 522 to adjust the engine via the motor to a position that enables a cold engine start. For example, the controller may determine that the engine has been shut down for a longer duration such that a subsequent engine start will be a cold start. Herein, the motor may rotate the crankshaft either forward or backward to a position that enables cold start. For example, the position of the intake and exhaust valves, and piston positions of cylinders of the engine may be adjusted such that intake manifold pressure is reduced as the engine starts up. In another example, the position of the engine at 506 may be suitable for a subsequent engine cold start. Accordingly, the position of the engine may not be changed from that at 506 in routine 500.

It will be noted that in some examples the motor may adjust the engine (and crankshaft) after completion of the intake manifold leak test to a position that is different from the position of the engine during the leak test of the intake manifold. To elaborate, the position of the crankshaft (and engine) at 506 of routine 500 may be distinct from the position of the engine (and crankshaft) at either 524 or 522 of routine 500. In other examples, the position of the engine (and the crankshaft) may not be adjusted after completion of the leak test in the intake manifold. As such, the position of the engine resulting in all intake valves (or all exhaust valves) being closed may be retained after the leak test of the intake manifold is completed.

Next, at 526, routine 500 restores the position of other valves of the engine including the position of the intake throttle, the EGR valve, and the CPV. For example, the intake throttle may be transitioned from the fully closed position during the leak test of the intake manifold to a more open position after completion of the leak test of the intake manifold. In the example wherein other diagnostic approaches are activated to diagnose for lean engine conditions, the positions of the intake throttle, the EGR valve, and the CPV may be adjusted based on the diagnostic approaches used.

In this manner, an example hybrid vehicle system may comprise an engine including a first cylinder and a second cylinder, the first cylinder having a first intake valve and a first exhaust valve, and the second cylinder including a second intake valve and a second exhaust valve, an intake manifold fluidically communicating with each of the first cylinder and the second cylinder via the first intake valve and the second intake valve respectively, a motor coupled to a battery, a generator also coupled to the battery, vehicle wheels propelled using torque from one or more of the engine, the generator, and the motor, an intake throttle controlling air flow into the intake manifold, a pressure sensor coupled to the intake manifold, and a fuel system including a fuel tank coupled to a canister, the canister coupled to the intake manifold via a purge valve.

The example hybrid vehicle system may also include a controller with computer-readable instructions stored in non-transitory memory for, in response to determining lean engine conditions, initiating a leak test in the intake manifold during a subsequent engine rundown to engine stop. The initiation of the leak test may include closing each of the intake throttle and canister purge valve, generating a vacuum in the intake manifold, closing one of the first intake valve and the first exhaust valve of the first cylinder while simultaneously closing one of the second intake valve and the second exhaust valve of the second cylinder responsive to vacuum in the intake manifold attaining a pre-determined level, and monitoring changes in the vacuum in the intake manifold over a pre-determined duration. The controller may include instructions for indicating a leak in the intake manifold when vacuum in the intake manifold decreases to a threshold level within the pre-determined duration. Closing one of the first intake valve and the first exhaust valve of the first cylinder while simultaneously closing one of the second intake valve and the second exhaust valve of the second cylinder may comprise rotating the engine via the motor to a first position where one of the first intake valve and the first exhaust valve of the first cylinder and one of the second intake valve and the second exhaust valve of the second cylinder are fully closed. Thus, the intake manifold may be sealed from the atmosphere. The controller may include additional instructions for rotating the engine via the motor to a second position after completing the leak test in the intake manifold, the second position being different from the first position. The second position may be based on whether the engine may experience a subsequent hot start or a cold start. In alternative examples, the second position may be the same as the first position. Accordingly, in these alternative examples, the controller may not rotate the engine via the motor after completion of the leak test in the intake manifold. The controller may include further instructions for not indicating the leak in the intake manifold in response to vacuum in the intake manifold remaining higher than the threshold level within the pre-determined duration.

Thus, an intake manifold in an engine may be checked for leaks with a method that is less complex and more reliable. A camless engine featuring electrical or electro-mechanical actuators for each of the intake valves and the exhaust valves of each cylinder of the camless engine may enable this more reliable method. Alternatively, the same method may be employed for engines including cams and camshafts for valve operation by using extra valves that can substantially isolate the intake manifold from the atmosphere. Further still, a motor in a hybrid vehicle or a motor in a vehicle with a start-stop system may be used to rotate the engine to seal the intake manifold from the atmosphere. Herein, the engine may not be camless.

The leak test is initiated during an engine shut down (to rest) only after lean engine conditions are detected. Vacuum is generated in the intake manifold prior to an anticipated engine shut down by terminating all air flow into the intake manifold. For example, the intake throttle may be adjusted to fully closed (from an open position). Further, other sources of intake air such as EGR and canister purge may also be discontinued. Once a desired level of vacuum (or negative pressure) is achieved in the intake manifold due to piston motion within the cylinders of the engine, the intake manifold is isolated from the atmosphere by closing all intake valves of each cylinder of the engine. Alternatively, all exhaust valves of all cylinders may be fully closed to seal the intake manifold from the atmosphere. By sealing the intake manifold from the atmosphere only after the desired level of vacuum (or pre-determined vacuum level) is attained in the intake manifold, the leak test may be reliably repeated. Further, the controller may not store different rates of vacuum decrease in its memory since the same pre-determined level of vacuum (Threshold_P) is attained in the intake manifold before monitoring for leaks.

The sealed intake manifold may now be observed for changes in vacuum level within a pre-determined specific duration. If the vacuum level in the intake manifold reduces to below a threshold level (e.g., Threshold_L) within the specific duration, the intake manifold may have leaks. However, if the vacuum in the intake manifold remains higher than the threshold level in the pre-determined duration, the intake manifold may be substantially robust without leaks.

Turning now to FIG. 6, it portrays map 600 depicting an example leak test performed in an engine in a non-hybrid vehicle. Further, the vehicle may also not be equipped with a start-stop system. Further still, the engine may be a camless engine including cylinders with camless intake valves. The cylinders may also include camless exhaust valves. Map 600 includes indication of intake manifold (IM) leak at plot 602, initiation of the IM leak test at plot 604, vacuum level in the intake manifold at plot 606, status of all intake valves of all cylinders of the engine at plot 608, status of the canister purge valve (CPV) at plot 610, position of the intake throttle at plot 612, engine speed at plot 614, and a position of a gear selector at plot 616. All the above are plotted against time on the x-axis. It will be noted that time increases from the left of the x-axis to the right of the x-axis. Line 603 represents atmospheric pressure (or barometric pressure). Line 605 represents the threshold level of vacuum (Threshold_L of routines 400 and 500) in the intake manifold. Specifically, line 605 represents the threshold level of vacuum for determining if a leak is present in the intake manifold of the engine. Line 607 represents the pre-determined vacuum level (Threshold_P of routine 400) in the intake manifold. To elaborate, the pre-determined vacuum in the intake manifold is the level of vacuum that is generated in the intake manifold before closing all intake valves of all cylinders of the engine. As shown, the pre-determined level of vacuum, Threshold_P (line 607) may be a higher amount of vacuum than the threshold level (line 605) of vacuum for determining a leak in the intake manifold.

The position of the gear selector includes only two positions: drive and park, though other positions are available (including reverse, neutral, etc.). It will also be noted that the status of the intake valves of all cylinders at plot 608 can vary between a variable status and an all closed status. The variable status represents the variability of intake valve position during an engine cycle. Based on the cylinder stroke, the position of the respective intake valves may vary between fully open, fully closed, and any position therebetween.

Prior to t1, the vehicle may be operating with the gear selector in the "drive" position. Further, engine speed may be lower with the intake throttle at a mostly closed (or partly open) position. At this position of the intake throttle, a lower amount of air flow may be drawn into the intake manifold. The manifold vacuum may be relatively high since the intake throttle is mostly closed. Further, the CPV may be closed. The status of the intake valves of the cylinders may be variable based on the stroke in each cylinder during engine operation.

At t1, the throttle may be transitioned to fully open from the partly open position in response to a sudden increase in torque demand. For example, the vehicle may be accelerating to merge with traffic on a highway. In response to the fully open position of the intake throttle, engine speed rises temporarily and manifold vacuum reduces to substantially atmospheric pressure. At t2, the engine speed reduces as the intake throttle position is adjusted to between fully open and fully closed. For example, the vehicle may now be cruising on the highway and engine speed reduces responsive to the cruising conditions. As such, the position of the intake throttle may be halfway between the fully open position and the fully closed position, allowing a desired amount of air to flow into the intake manifold. Since the intake throttle is half-closed (relative to fully open between t1 and t2), manifold vacuum increases and stabilizes. The steady state cruising conditions enable an opening of the CPV at t2 to allow purging of stored fuel vapors from a fuel system canister.

At t3, engine speed may reduce as the intake throttle is adjusted towards a more closed position. For example, the vehicle may be slowing down to come to rest. At t4, the vehicle operator shifts the gear selector from "drive" to "park". As such, an engine shut down may be imminent. Accordingly, a leak test may be initiated at t4. Though not specified in the example depicted in map 600, the leak test may be initiated only after diagnosing leaner than desired engine conditions (as described earlier in reference to FIG. 3). In response to the imminent engine shut down, the desired intake manifold leak test may be initiated by adjusting the intake throttle to the fully closed position at t4. Simultaneously, the CPV may also be adjusted fully closed to discontinue the flow of purged vapors and air into the intake manifold. In response to the termination of air flow into the intake manifold and the rotation of the engine as it spins down to rest, manifold vacuum increases as shown by plot 606.

At t5, the level of manifold vacuum reaches the pre-determined vacuum level represented by line 607. As an example, the pre-determined vacuum level may be 10 inches of mercury. Upon attaining the pre-determined vacuum in the intake manifold, all the intake valves of all cylinders of the engine may be shut closed. Accordingly, any further motion of the engine (and pistons in the cylinders) may not affect the level of vacuum in the intake manifold. In other words, the intake manifold may be sealed from the atmosphere at t5. As shown by plot 614, even though the engine speed comes to rest after t5, manifold vacuum does not increase further after t5. It will be appreciated that the example leak test of map 600 only shows closing all the intake valves of all cylinders of the engine. In other examples, all exhaust valves of all cylinders of the engine may be shut closed in response to manifold vacuum attaining the pre-determined vacuum level.

As such, the vacuum level in the intake manifold may be observed after t5. Specifically, the intake manifold vacuum levels may be monitored for determining intake manifold leaks after all the intake valves are closed (plot 608) at t5. Further, the intake manifold vacuum levels may be monitored for the leak check for a pre-determined duration D after all the intake valves are closed (plot 608) at t5. The pre-determined duration D may last from t5 until t6, as shown on map 600. As depicted by plot 606, manifold vacuum decreases slightly from the pre-determined vacuum level (line 607) in the pre-determined duration D. However, this decrease in manifold vacuum is not significant. As such, manifold vacuum remains higher than threshold level, Threshold_L, represented by line 605, as pre-determined duration D ends. Thus, no leaks may be present in the intake manifold, and no leaks are indicated at t6 (plot 602). Further, the leak test may be terminated at t6. At the same time, the position of the intake valves of the cylinders of engine may be restored to a desired position (e.g., variable) for a subsequent engine start. Optionally, some of the intake valves of some cylinders of the engine may be maintained closed as shown by dashed section 609. The CPV may be retained at its closed position and the intake throttle may be adjusted to partly open.

Between t6 and t7, a certain length of time of vehicle operation may pass. In one example, the duration between t6 and t7 may be 48 hours. In another example, the duration may be 1 week. At t7, therefore, a drive cycle distinct from the drive cycle between t1 and t6 may be occurring. As such, the vehicle may be moving with the engine operating at a steady state (e.g., medium) speed with the gear selector in the "drive" position. The intake throttle position may be about midway between fully closed and fully open allowing sufficient air flow into the intake manifold. As shown, the CPV may be opened to purge stored fuel vapors from the canister. Further, the intake valves of all the cylinders may be operational. Thus, the position of each intake valve of each cylinder of the engine may be variable based on the respective cylinder stroke. Manifold vacuum level may be lower since the intake throttle is open allowing adequate air flow into the intake manifold.

At t8, the vehicle may slow down as depicted by the reduction in engine speed and the decrease in the opening of the intake throttle. Specifically, the intake throttle position may be adjusted from midway between fully open and fully closed to a mostly closed position. As such the vehicle may be slowing down to a stop. At t9, the gear selector is transitioned from the "drive" position to the "park" position indicating an imminent engine shut down. Accordingly, another leak test for the intake manifold may be initiated at t9. Though not specifically shown, the leak test may be initiated in response to detection of lean engine conditions prior to the engine shut down. Thus, the leak test may be initiated during an engine rundown to engine stop.

The leak test of the intake manifold is initiated at t9 by simultaneously closing each of the intake throttle and the CPV, thus, terminating air flow into the intake manifold. Specifically, the intake throttle is adjusted to the fully closed position at t9, and the CPV is also fully closed at t9. Though not shown, other valves and passages that allow air to enter the intake manifold, such as an EGR valve, may also be closed to block entry of air into the intake manifold once the leak test in initiated.

In response to closing each of the intake throttle and the CPV, vacuum in the intake manifold rises (plot 606) after t9. At t10, vacuum build up in the intake manifold reaches the pre-determined vacuum level (line 607). Electro-mechanical actuators may then adjust all the intake valves of all cylinders of the engine to their respective fully closed positions in response to intake manifold vacuum levels rising to the pre-determined level, e.g., Threshold_P of FIG. 4. Thus, the intake manifold may now be substantially sealed from the atmosphere and may contain vacuum at the pre-determined vacuum level at t10. It will be noted that the engine may continue to spin for a short time after all the intake valves are closed (plot 614). Thus, the intake valves of all cylinders of the engine may be closed before the engine shuts down to rest.

The controller may now monitor the intake manifold vacuum levels for the pre-determined duration D. Specifically, the controller may observe changes in the level of vacuum in the intake manifold. For example, leaks in the intake manifold may allow air into the intake manifold causing a decrease in the level of intake manifold vacuum. Between t10 and t11 the level of vacuum may be monitored for the pre-determined duration D. As shown in map 600, manifold vacuum levels reduce in the pre-determined duration D such that at t11, the level of manifold vacuum is lower than the threshold level, Threshold_L (line 605). Accordingly, a leak in the intake manifold may be indicated at t11 (plot 602). Thus, the leak test may be completed at t11 (plot 604), and various valves may be restored to their default or desired positions. For example, some of the intake valves of certain cylinders of the engine may be adjusted open at t11. At the same time, remaining intake valves may be maintained closed as depicted by the dashed line 611. The CPV and the intake throttle may be maintained fully closed. Alternatively, the intake throttle may be adjusted to a partly open position at t11 as shown by dashed line 613.

In this manner, an example method may comprise adjusting a position of an intake throttle to generate vacuum in an intake manifold of the engine responsive to an anticipated shut down of an engine, closing each camless intake valve of each cylinder of the engine before the engine shuts down to rest, monitoring the vacuum for a pre-determined duration (duration D), and indicating a leak in the intake manifold in response to the vacuum decreasing below a threshold (e.g., Threshold_L or line 605 of map 600). The position of the intake throttle may be adjusted responsive to diagnosing lean conditions in the engine. Adjusting the position of the intake throttle may include adjusting the intake throttle to a fully closed position (such as at t4 or t9 of map 600), such that air flow into the intake manifold is discontinued or terminated. The method may further comprise adjusting each of an exhaust gas recirculation valve and a canister purge valve to a respective closed position (such as at t4 and t9 of map 600) simultaneously with adjusting the position of the intake throttle to the fully closed position. The anticipated shut down of the engine may be determined when a gear selector is transitioned from a non-parked position (such as a "drive" position) to a parked position. As such, each camless intake valve of each cylinder of the engine may be closed in response to the vacuum in the intake manifold attaining a pre-determined level (e.g., Threshold_P of routine 400). Further, each camless intake valve of each cylinder of the engine may be actuated (e.g., closed, opened) via an electro-mechanical actuator. The method may further comprise applying leftover vacuum from the intake manifold to diagnose a fuel system for leaks after indicating the leak in the intake manifold (as shown in routine 400). Thus, the method may include indicating the leak in the intake manifold when all the intake valves are closed.

FIG. 7 includes an example leak test for an intake manifold (IM) of an engine included in a hybrid vehicle. Map 700 of FIG. 7 includes initiation of the IM leak test at plot 702, vacuum level in the intake manifold at plot 704, rotation of the engine via a first motor at plot 706, status of all the intake valves of all cylinders of the engine at plot 708, engine speed at plot 710, position of the intake throttle at plot 712, status of the engine (on/off) at plot 714, and status of a generator (also termed, motor) at plot 716. All the above are plotted against time on the x-axis. It will be noted that time increases from the left of the x-axis to the right of the x-axis. Further, the hybrid vehicle comprises two motors, or a motor and a generator. To elaborate, the first motor that is utilized to rotate the engine may be distinct from the second motor or generator propelling the vehicle during an engine-off mode.

Line 703 represents the pre-determined vacuum level (Threshold_P of routine 400) in the intake manifold. Line 705 represents the threshold level of vacuum (Threshold_L of routine 500) in the intake manifold. Specifically, line 705 represents the threshold level of vacuum for determining if a leak is present in the intake manifold of the engine. Line 707 represents atmospheric pressure (or barometric pressure). To elaborate, the pre-determined vacuum, Threshold_P, in the intake manifold is the level of vacuum that is generated in the intake manifold before closing all intake valves of all cylinders of the engine. As shown, the pre-determined level of vacuum, Threshold_P (line 703) may be a higher amount of vacuum than the threshold level (line 705) of vacuum for determining a leak in the intake manifold.

Prior to t1, the hybrid vehicle may be propelled primarily by the engine depicted by the engine status at "on" and the motor status at "off". The intake throttle may be at position that is about halfway between the fully closed and fully open positions. As such, the vehicle may be cruising on a highway with a moderate engine speed (plot 710). The intake valves of the cylinders of the engine may be at variable positions (plot 708) since the engine is operational. As noted earlier in reference to FIG. 6, the status of the intake valves of all cylinders at plot 708 can vary between a variable status and an all closed status. The variable status represents the variability of intake valve position during an engine cycle. Based on the cylinder stroke during engine operation, the position of the respective intake valves may vary between fully open, fully closed, and any position therebetween.

Prior to t1, the vacuum levels in the intake manifold may be relatively lower (or shallow) since the intake throttle is allowing a substantial amount of air into the intake manifold. At t1, the intake throttle may be adjusted to a more closed position reducing the amount of air flowing into the intake manifold. For example, the vehicle may be slowing down as it approaches an exit of the highway. Engine speed may reduce and intake manifold vacuum levels may rise with the change in position of the intake throttle. An engine shut down may be imminent as the vehicle may be subsequently driving on city streets where motor torque may be more efficient than engine torque. Accordingly, an intake manifold leak test may be initiated at t2. Though not specifically shown, leaner than desired engine conditions may be detected in the engine prior to the engine shut down inducing the intake manifold leak test to be performed at the ensuing engine shut down.

Therefore, at t2, the intake throttle may be adjusted to fully closed position and the engine may be shut down (plot 714) while simultaneously the second motor or generator is activated. As the engine rotates to rest after t2, intake manifold vacuum rises with the closure of the intake throttle. By t3, the intake manifold vacuum is at the pre-determined vacuum level (line 703) and the engine is at rest or engine stop (plot 710). In response to the intake manifold vacuum reaching the pre-determined vacuum level, the first motor may rotate the crankshaft of the engine (plot 706) to a position that fully closes all intake valves (plot 708) of all cylinders of the engine. In one example, the first motor may rotate the engine in a forward direction if the forward direction enables a faster closing of all the intake valves. In another example the first motor may rotate the engine in a backward direction if the backward direction enables a faster closing of all the intake valves.

Thus, at t3, all the intake valves of all the cylinders of the engine may be fully closed isolating the intake manifold from the atmosphere. The vacuum level in the intake manifold may be monitored for the pre-determined duration D (between t3 and t4) to observe changes in the level of the vacuum. It will be appreciated that the pre-determined duration for the hybrid vehicle in some examples may be different from the pre-determined duration utilized in the leak test of a non-hybrid vehicle. As shown, the level of vacuum in the intake manifold reduces during the pre-determined duration D. At t4, the level of vacuum in the intake manifold is lower than the threshold level (line 705). Accordingly, a leak may be present in the intake manifold, and may be indicated by the controller (not shown in FIG. 7). The leak test may now be complete (plot 702) and the first motor may rotate the engine at t4 to a different position from that at t3. Specifically, the first motor may rotate the engine to a different position based on a desired position of the intake valves in anticipation of a subsequent engine start. In another example, the first motor may not rotate the engine as shown at t4 and the engine may be retained in the position it is at t3.

In this way, an intake manifold of an engine may be diagnosed for leaks. Vacuum is generated in the intake manifold during an impending engine shut down. Once a desired (pre-determined) level of vacuum is attained, the intake manifold may be sealed from the atmosphere by closing all intake valves (or all exhaust valves) of all cylinders of the engine. The technical effect of isolating the intake manifold from the atmosphere during the leak test is a more accurate and less complex leak test. By ensuring that the intake manifold achieves the pre-determined level of vacuum during every leak test, the leak test may be performed without referencing multiple look-up tables including different rates of change in vacuum. The leak test may be more reliably performed repetitively by generating the pre-determined level of vacuum each time the leak test is activated. As such, the leak test may be simpler and may provide more accurate results enabling improved performance of the engine.

In another representation, an example method for a camless engine may comprise generating a vacuum in an intake manifold of the camless engine as the camless engine spins to rest, isolating the intake manifold from atmosphere by closing each intake valve of each cylinder of the camless engine after the vacuum in the intake manifold exceeds a vacuum threshold, indicating a leak in the intake manifold when the vacuum decreases to lower than a threshold level, and applying leftover vacuum from the intake manifold to test a fuel system for leaks, the fuel system coupled to the engine.

In yet another representation, an example hybrid vehicle system may comprise an engine, a cylinder of the engine having an intake valve and an exhaust valve, an intake manifold fluidically communicating with the cylinder via the intake valve, a motor coupled to a battery, a generator also coupled to the battery, vehicle wheels propelled using torque from one or more of the engine, the generator, and the motor, an intake throttle controlling air flow into the intake manifold, a pressure sensor coupled to the intake manifold, an exhaust gas recirculation (EGR) passage fluidically coupling an exhaust passage to the intake manifold via an EGR valve, and a fuel system including a fuel tank coupled to a canister, the canister coupled to the intake manifold via a canister purge valve.

The example hybrid vehicle system may also include a controller with computer-readable instructions stored in non-transitory memory for, in response to determining lean engine conditions, initiating a leak test in the intake manifold during a subsequent engine rundown to engine stop. The initiation of the leak test may include closing each of the intake throttle, the EGR valve, and canister purge valve, generating a vacuum in the intake manifold, closing one of the intake valve and the exhaust valve of the cylinder responsive to vacuum in the intake manifold attaining a pre-determined level, and monitoring changes in the vacuum in the intake manifold over a pre-determined duration. The controller may include instructions for indicating a leak in the intake manifold when vacuum in the intake manifold decreases to or below a threshold level within the pre-determined duration. The intake valve and/or the exhaust valve of the cylinder may be closed by rotating the engine via the motor to a first position such that the intake valve and/or the exhaust valve of the cylinder is fully closed. Thus, the intake manifold may be sealed from the atmosphere. The controller may include additional instructions for rotating the engine via the motor to a second position after completing the leak test in the intake manifold, the second position being different from the first position. The second position may be based on whether the engine may experience a subsequent hot start or a cold start.

In a further representation, an example system may comprise an engine, a cylinder of the engine having an intake valve, the intake valve actuated independently of rotation of the engine, an intake manifold fluidically communicating with the cylinder via the intake valve, an intake throttle controlling air flow into the intake manifold, a pressure sensor coupled to the intake manifold, an exhaust gas recirculation (EGR) passage fluidically coupling an exhaust passage to the intake manifold via an EGR valve, and a fuel system including a fuel tank coupled to a canister, the canister coupled to the intake manifold via a canister purge valve. The example system may also include a controller with computer-readable instructions stored in non-transitory memory for, in response to determining lean engine conditions, initiating a leak test in the intake manifold during a subsequent engine shut down to rest. The initiation of the leak test may include closing each of the intake throttle, the EGR valve, and the canister purge valve, and generating a vacuum in the intake manifold. Further, responsive to vacuum in the intake manifold attaining a pre-determined level, the intake valve of the cylinder may be closed to seal the intake manifold from the atmosphere, and changes in the vacuum in the intake manifold may be monitored over a pre-determined duration. The controller may include instructions for indicating a leak in the intake manifold when vacuum in the intake manifold decreases to or below a threshold level within the pre-determined duration. The intake valve of the cylinder may be closed by actuating an electro-mechanical actuator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting all intake valves closed in each cylinder of the engine responsive to vacuum in an intake manifold reaching a pre-determined vacuum during engine shut down; and
indicating a leak in the intake manifold based on a change in a level of vacuum in the intake manifold.

2. The method of claim 1, wherein the change in the level of vacuum in the intake manifold includes a decrease in the level of vacuum from the pre-determined vacuum, and wherein the leak is indicated when the level of vacuum decreases below a threshold level.

3. The method of claim 1, wherein the vacuum in the intake manifold is produced by closing an intake throttle and discontinuing flow of air into the intake manifold.

4. The method of claim 3, wherein the intake throttle is closed in response to determining an impending engine shut down.

5. The method of claim 4, wherein the impending shut down is determined when a gear selector is shifted to a parked position.

6. The method of claim 3, further comprising producing vacuum in the intake manifold by closing each of an exhaust gas recirculation valve and a canister purge valve in response to an impending engine shut down.

7. The method of claim 1, wherein all intake valves of each cylinder of the engine are closed via an electro-mechanical actuator.

8. The method of claim 1, wherein the engine is arranged within a hybrid electric vehicle, and wherein all intake valves of each cylinder of the engine are closed by rotating the engine via a generator to a position such that all intake valves of each cylinder of the engine are fully closed.

9. The method of claim 1, further comprising applying leftover vacuum in the intake manifold to a fuel system for a leak check in the fuel system after indicating the leak in the intake manifold.

10. A method, comprising:
adjusting a position of an intake throttle to generate vacuum in an intake manifold of an engine responsive to an anticipated shut down of the engine;
closing each camless intake valve of each cylinder of the engine before the engine shuts down to rest;
monitoring the vacuum for a pre-determined duration; and
indicating a leak in the intake manifold in response to the vacuum decreasing below a threshold.

11. The method of claim 10, wherein the position of the intake throttle is adjusted responsive to diagnosing lean conditions in the engine, and wherein adjusting the position of the intake throttle includes adjusting the intake throttle to a fully closed position.

12. The method of claim 11, further comprising adjusting each of an exhaust gas recirculation valve and a canister purge valve to a respective closed position simultaneously with adjusting the position of the intake throttle to the fully closed position.

13. The method of claim 10, wherein the anticipated shut down of the engine is determined when a gear selector is transitioned from a non-parked position to a parked position.

14. The method of claim 10, wherein each camless intake valve of each cylinder of the engine is closed in response to the vacuum in the intake manifold attaining a pre-determined level.

15. The method of claim 14, wherein each camless intake valve of each cylinder of the engine is actuated via an electro-mechanical actuator.

16. The method of claim 10, further comprising applying leftover vacuum from the intake manifold to diagnose a fuel system for leaks after the pre-determined duration.

17. A hybrid vehicle system, comprising:
an engine including a first cylinder and a second cylinder, the first cylinder having a first intake valve and a first exhaust valve, and the second cylinder including a second intake valve and a second exhaust valve;
an intake manifold fluidically communicating with each of the first cylinder and the second cylinder via the first intake valve and the second intake valve respectively;
a motor coupled to a battery;
a generator coupled to the battery;
vehicle wheels propelled using torque from one or more of the engine, the generator, and the motor;
an intake throttle controlling air flow into the intake manifold;
a pressure sensor coupled to the intake manifold;
a fuel system including a fuel tank coupled to a canister, the canister coupled to the intake manifold via a canister purge valve; and
a controller with computer-readable instructions stored in non-transitory memory for:
in response to determining lean engine conditions,
initiating a leak test in the intake manifold during a subsequent engine rundown to engine stop by closing each of the intake throttle and canister purge valve;
generating a vacuum in the intake manifold;
closing one of the first intake valve and the first exhaust valve of the first cylinder while simultaneously closing one of the second intake valve and the second exhaust valve of the second cylinder responsive to vacuum in the intake manifold attaining a pre-determined level; and
indicating a leak in the intake manifold when vacuum in the intake manifold decreases to a threshold level within a pre-determined duration.

18. The hybrid vehicle system of claim 17, wherein closing one of the first intake valve and the first exhaust valve of the first cylinder while simultaneously closing one of the second intake valve and the second exhaust valve of the second cylinder includes rotating the engine via the motor to a first position where one of the first intake valve and the first exhaust valve of the first cylinder and one of the second intake valve and the second exhaust valve of the second cylinder are fully closed.

19. The hybrid vehicle system of claim 18, wherein the controller includes additional instructions for rotating the engine via the motor to a second position after completing the leak test in the intake manifold, the second position being different from the first position.

20. The hybrid vehicle system of claim 17, wherein the controller includes additional instructions for not indicating the leak in the intake manifold in response to vacuum in the intake manifold remaining higher than the threshold level within the pre-determined duration.

* * * * *